(12) United States Patent
Jarvis et al.

(10) Patent No.: US 10,728,621 B2
(45) Date of Patent: *Jul. 28, 2020

(54) SYSTEM AND METHOD FOR PRESENTING ELECTRONIC MEDIA ASSETS

(71) Applicant: Oath Inc., Dulles, VA (US)

(72) Inventors: Peter Jarvis, San Jose, CA (US); Christopher Webster, Redwood City, CA (US)

(73) Assignee: Oath Inc., Dulles, VA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/151,560

(22) Filed: Oct. 4, 2018

(65) Prior Publication Data

US 2019/0037274 A1 Jan. 31, 2019

Related U.S. Application Data

(63) Continuation of application No. 15/395,035, filed on Dec. 30, 2016, now Pat. No. 10,123,080.

(51) Int. Cl.
*H04N 21/4627* (2011.01)
*H04N 21/437* (2011.01)
*H04N 21/2187* (2011.01)
*H04N 21/472* (2011.01)
*H04N 21/462* (2011.01)
(Continued)

(52) U.S. Cl.
CPC ..... *H04N 21/4627* (2013.01); *H04N 21/2187* (2013.01); *H04N 21/26283* (2013.01); *H04N 21/431* (2013.01); *H04N 21/437* (2013.01); *H04N 21/454* (2013.01); *H04N 21/462* (2013.01); *H04N 21/4622* (2013.01); *H04N 21/47202* (2013.01); *H04N 21/47211* (2013.01); *H04N 21/482* (2013.01);
(Continued)

(58) Field of Classification Search
CPC ............. H04N 21/462; H04N 21/4627; H04N 21/2665; H04N 21/431; H04N 21/4622; H04N 21/482
See application file for complete search history.

(56) References Cited

U.S. PATENT DOCUMENTS 7,904,924 B1 * 3/2011 de Heer ............ G06Q 30/0282
705/347
2008/0209491 A1 * 8/2008 Hasek ................ H04N 7/17318
725/114
(Continued)

*Primary Examiner* — Robert J Hance
(74) *Attorney, Agent, or Firm* — Bookoff McAndrews, PLLC

(57) ABSTRACT

A method of presenting electronic media assets may include retrieving metadata for a plurality of electronic media assets over a computer network, determining if one or more media assets is a transactional media asset, adding the transactional media assets to a media asset list, determining if one or more media assets is a subscription media asset, adding the subscription media assets to the media asset list, determining if one or more media assets is a live event media asset, adding the live event media assets to the media asset list, determining if one or more media assets is a current linear media asset, adding the current linear media assets to the media asset list, determining if one or more media assets is a future linear media asset adding the future linear media assets to the media asset list, and presenting the media title list to the consumer.

17 Claims, 8 Drawing Sheets

(51) Int. Cl.
    *H04N 21/482*     (2011.01)
    *H04N 21/262*     (2011.01)
    *H04N 21/431*     (2011.01)
    *H04N 21/8355*    (2011.01)
    *H04N 21/84*      (2011.01)
    *H04N 21/454*     (2011.01)

(52) U.S. Cl.
    CPC ..... *H04N 21/4828* (2013.01); *H04N 21/8355* (2013.01); *H04N 21/84* (2013.01)

(56) References Cited

U.S. PATENT DOCUMENTS

| | | | |
|---|---|---|---|
| 2010/0153885 A1* | 6/2010 | Yates | G06F 3/0482 |
| | | | 715/841 |
| 2011/0047578 A1* | 2/2011 | Kim | H04N 5/44591 |
| | | | 725/56 |
| 2011/0158610 A1* | 6/2011 | Paul | H04N 5/76 |
| | | | 386/297 |
| 2013/0291018 A1* | 10/2013 | Billings | H04L 51/32 |
| | | | 725/46 |

\* cited by examiner

SYSTEM AND METHOD FOR PRESENTING ELECTRONIC MEDIA ASSETS

CROSS-REFERENCE TO RELATED APPLICATION(S)

This patent application is a continuation and claims the benefit of priority to U.S. Nonprovisional patent application Ser. No. 15/395,035, filed on Dec. 30, 2016, the entirety of which is incorporated herein by reference.

TECHNICAL FIELD

Various embodiments of the present disclosure relate generally to retrieval and presentation of electronic media assets and, more particularly, to prioritizing and presenting multiple related electronic media assets.

BACKGROUND

Electronic media consumers may have access to electronic media assets from multiple sources and in multiple formats. When locating an electronic media asset to view or listen to, a consumer may search for an asset by media title. However, the consumer may have access to multiple assets related to a single title. For example, if the media title is associated with video media assets, the assets may include transactional video-on-demand (TVOD) assets, such as pay-per-view ("on demand") movies or events, etc., subscription video-on-demand (SVOD) assets, such as might be provided by subscription streaming services or premium cable TV providers, etc., advertising-supported video-on-demand (AVOD) assets, and linear airings, such as might be provided by standard cable TV channels or over-the-air broadcasters, etc. This may result in a confusing display of multiple electronic media assets including those that are readily accessible by the consumer, those that require additional fees, those that are already in progress and may not be viewed in their entirety, and those that will be available for later access. This may lead to confusion and dissatisfaction for the consumer and may lead to the consumer selecting an electronic media asset that does not best meet the consumer's needs or may result in the consumer not selecting any of the available electronic media assets. This may further result in lost revenue for providers of electronic media assets.

Accordingly, there is a need for systems and methods to allow the consumer to efficiently select among multiple electronic media assets related to the consumer's desired title in order to improve convenience and satisfaction for the consumer and increase revenue for providers of electronic media assets.

The present disclosure is directed to overcoming one or more of these above-referenced challenges.

SUMMARY OF THE DISCLOSURE

According to certain aspects of the disclosure, systems and methods are disclosed for presenting electronic media assets.

In one embodiment, a computer-implemented method is disclosed for presenting electronic media assets. The method includes: retrieving metadata for a plurality of electronic media assets over a computer network, determining, based on the retrieved metadata using a hardware processor, if one or more electronic media assets among the plurality of electronic media assets is a transactional electronic media asset, upon determining that one or more electronic media assets among the plurality of electronic media assets is a transactional electronic media asset, adding the transactional electronic media assets to a media asset list, determining, based on the retrieved metadata, if one or more electronic media assets among the plurality of electronic media assets is a subscription electronic media asset, upon determining that one or more electronic media assets among the plurality of electronic media assets is a subscription electronic media asset, adding the subscription electronic media assets to the media asset list, determining, based on the retrieved metadata, if one or more electronic media assets among the plurality of electronic media assets is a live event electronic media asset, upon determining that one or more electronic media assets among the plurality of electronic media assets is a live event electronic media asset, adding the live event electronic media assets to the media asset list, determining, based on the retrieved metadata, if one or more electronic media assets among the plurality of electronic media assets is a current linear electronic media asset, upon determining that one or more electronic media assets among the plurality of electronic media assets is a current linear electronic media asset, adding the current linear electronic media assets to the media asset list, determining, based on the retrieved metadata, if one or more electronic media assets among the plurality of electronic media assets is a future linear electronic media asset, upon determining that one or more electronic media assets among the plurality of electronic media assets is a future linear electronic media asset, adding the future linear electronic media assets to the media asset list, and presenting the media title list to the consumer.

According to certain aspects of the disclosure, non-transitory computer readable media are disclosed storing a program causing a computer to execute a method of presenting electronic media assets, One method comprises: retrieving metadata for a plurality of electronic media assets over a computer network, determining, based on the retrieved metadata using a hardware processor, if one or more electronic media assets among the plurality of electronic media assets is a transactional electronic media asset, upon determining that one or more electronic media assets among the plurality of electronic media assets is a transactional electronic media asset, adding the transactional electronic media assets to a media asset list, determining, based on the retrieved metadata, if one or more electronic media assets among the plurality of electronic media assets is a subscription electronic media asset, upon determining that one or more electronic media assets among the plurality of electronic media assets is a subscription electronic media asset, adding the subscription electronic media assets to the media asset list, determining, based on the retrieved metadata, if one or more electronic media assets among the plurality of electronic media assets is a live event electronic media asset, upon determining that one or more electronic media assets among the plurality of electronic media assets is a live event electronic media asset, adding the live event electronic media assets to the media asset list, determining, based on the retrieved metadata, if one or more electronic media assets among the plurality of electronic media assets is a current linear electronic media asset, upon determining that one or more electronic media assets among the plurality of electronic media assets is a current linear electronic media asset, adding the current linear electronic media assets to the media asset list, determining, based on the retrieved metadata, if one or more electronic media assets among the plurality of electronic media assets is a future linear electronic media asset, upon determining that one or more electronic media assets among the plurality of electronic media assets is a future linear electronic media asset, adding the future linear electronic media assets to the media asset list, and presenting the media title list to the consumer.

In accordance with another embodiment, a system is disclosed for presenting electronic media assets. The system comprises: a memory having processor-readable instructions stored therein; and a processor configured to access the memory and execute the processor-readable instructions, which when executed by the processor configures the processor to perform a plurality of functions, including functions to: retrieve metadata for a plurality of electronic media assets over a computer network, determine, based on the retrieved metadata using a hardware processor, if one or more electronic media assets among the plurality of electronic media assets is a transactional electronic media asset, upon determining that one or more electronic media assets among the plurality of electronic media assets is a transactional electronic media asset, ad the transactional electronic media assets to a media asset list, determine, based on the retrieved metadata, if one or more electronic media assets among the plurality of electronic media assets is a subscription electronic media asset, upon determining that one or more electronic media assets among the plurality of electronic media assets is a subscription electronic media asset, add the subscription electronic media assets to the media asset list, determine, based on the retrieved metadata, if one or more electronic media assets among the plurality of electronic media assets is a live event electronic media asset, upon determining that one or more electronic media assets among the plurality of electronic media assets is a live event electronic media asset, add the live event electronic media assets to the media asset list, determine, based on the retrieved metadata, if one or more electronic media assets among the plurality of electronic media assets is a current linear electronic media asset, upon determining that one or more electronic media assets among the plurality of electronic media assets is a current linear electronic media asset, add the current linear electronic media assets to the media asset list, determine, based on the retrieved metadata, if one or more electronic media assets among the plurality of electronic media assets is a future linear electronic media asset, upon determining that one or more electronic media assets among the plurality of electronic media assets is a future linear electronic media asset, add the future linear electronic media assets to the media asset list, and presenting the media title list to the consumer.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to generally to retrieval and presentation of electronic media assets and to prioritizing and presenting multiple related electronic media assets.

A search for media assets related to a specified title may return assets in multiple forms that are available across multiple providers. The results may further include assets that are currently in progress, starting at a later date or time, are currently inaccessible to the searching consumer, or that require additional payment in order to obtain access. If the results are not filtered or ordered appropriately, the consumer may experience confusion and dissatisfaction. This may further result in lost revenue to the providers of the assets.

In order to allow the consumer to efficiently select among multiple electronic media assets related to the consumer's desired title, one or more embodiments provide systems and methods for presenting electronic media assets. Such systems and methods may prioritize electronic media assets according to the type of asset (TVOD, SVOD, AVOD, linear, etc.), whether the consumer has playable rights to the asset (e.g., whether the consumer has already paid for a TVOD asset or has a subscription which includes the asset), the start time of the asset, and so on. Such a prioritization of electronic media assets may highlight the presentation of the most relevant and useful assets to the consumer and may reduce or remove the visibility of assets that the consumer cannot access. Such prioritization may improve convenience and satisfaction for the consumer and may increase revenue for providers of electronic media assets.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
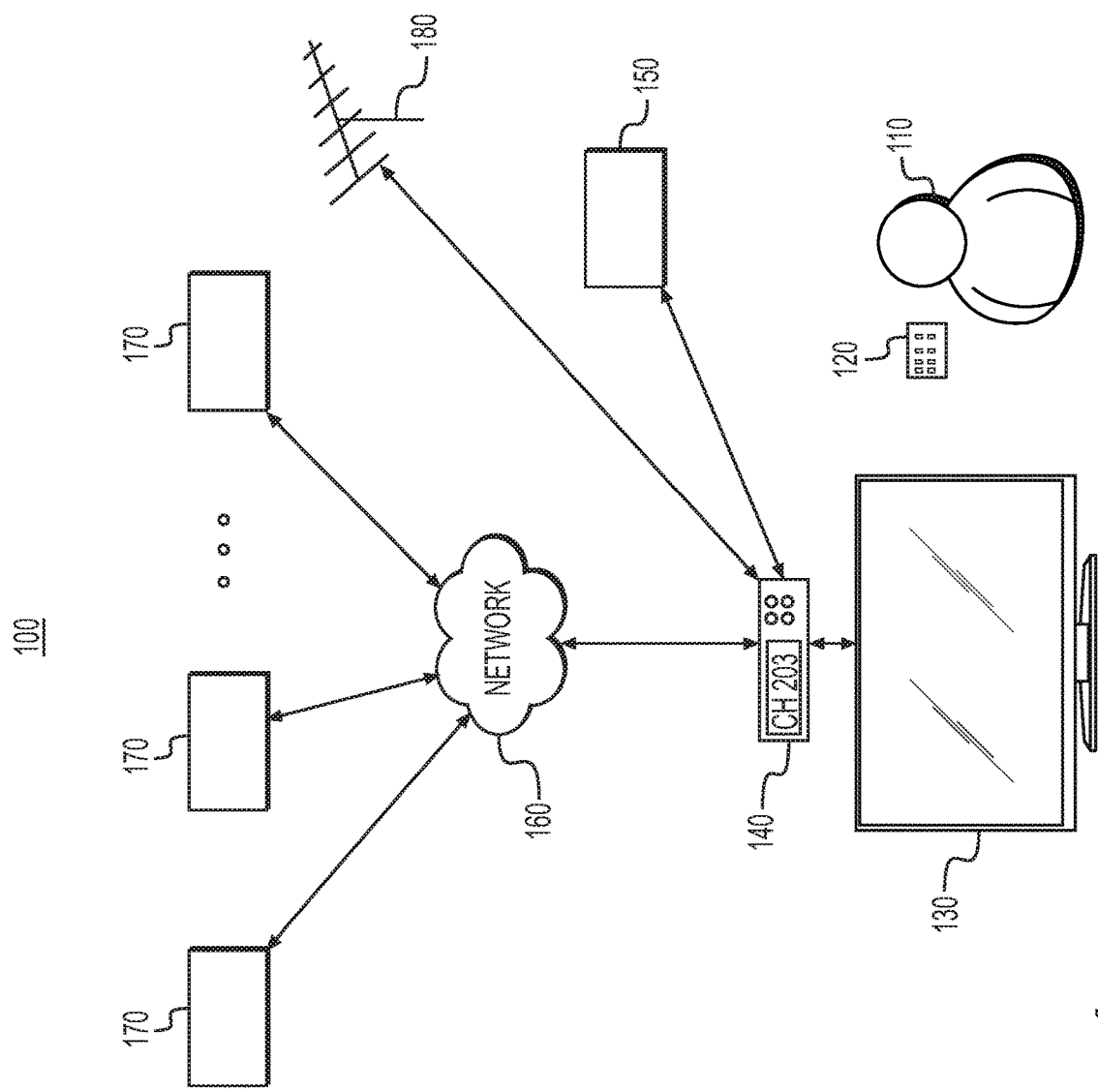
FIG. 1 depicts an exemplary system infrastructure for retrieving and displaying electronic media assets, according to one or more embodiments.

Any suitable system infrastructure may be put into place to allow for searching and presentation of electronic media assets. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As shown in FIG. 1, a consumer of electronic media assets, such as consumer 110, may employ an infrastructure for retrieving and displaying electronic media assets in order to retrieve desired electronic media assets. Consumer 110 may interact with a device for retrieval of electronic media assets, such as set top box 140, possibly employing a user interaction device, such as a wireless remote control 120. However, the device for retrieval of electronic media assets is not limited to a set top box and may include, for example, a streaming digital media player, a gaming console, a personal computer or laptop, a special purpose device, and the like. Likewise, the user interaction device is not limited to a wireless remote control, but may include, for example, a smartphone or tablet, etc. Set top box 140 may display electronic media assets and other user interface information on a suitable display device, such as television 130 depicted in FIG. 1. However, other display devices may be used, such as, for example, a video monitor, personal computer or laptop display, smartphone, or tablet, etc. Set top box 140 may retrieve electronic media assets and information related to the electronic media assets from a variety of sources. For example, set top box 140 may retrieve electronic media assets and information related to the electronic media assets from a cable television provider 150, an over the air antenna 180, or one or more streaming electronic media asset providers 170, which may be connected to set top box 140 by a computer network, such network 160 depicted in FIG. 1. In addition, set top box 140 may retrieve information related to electronic media assets from a electronic media asset metadata server (not shown) over the computer network.

Figure 2:
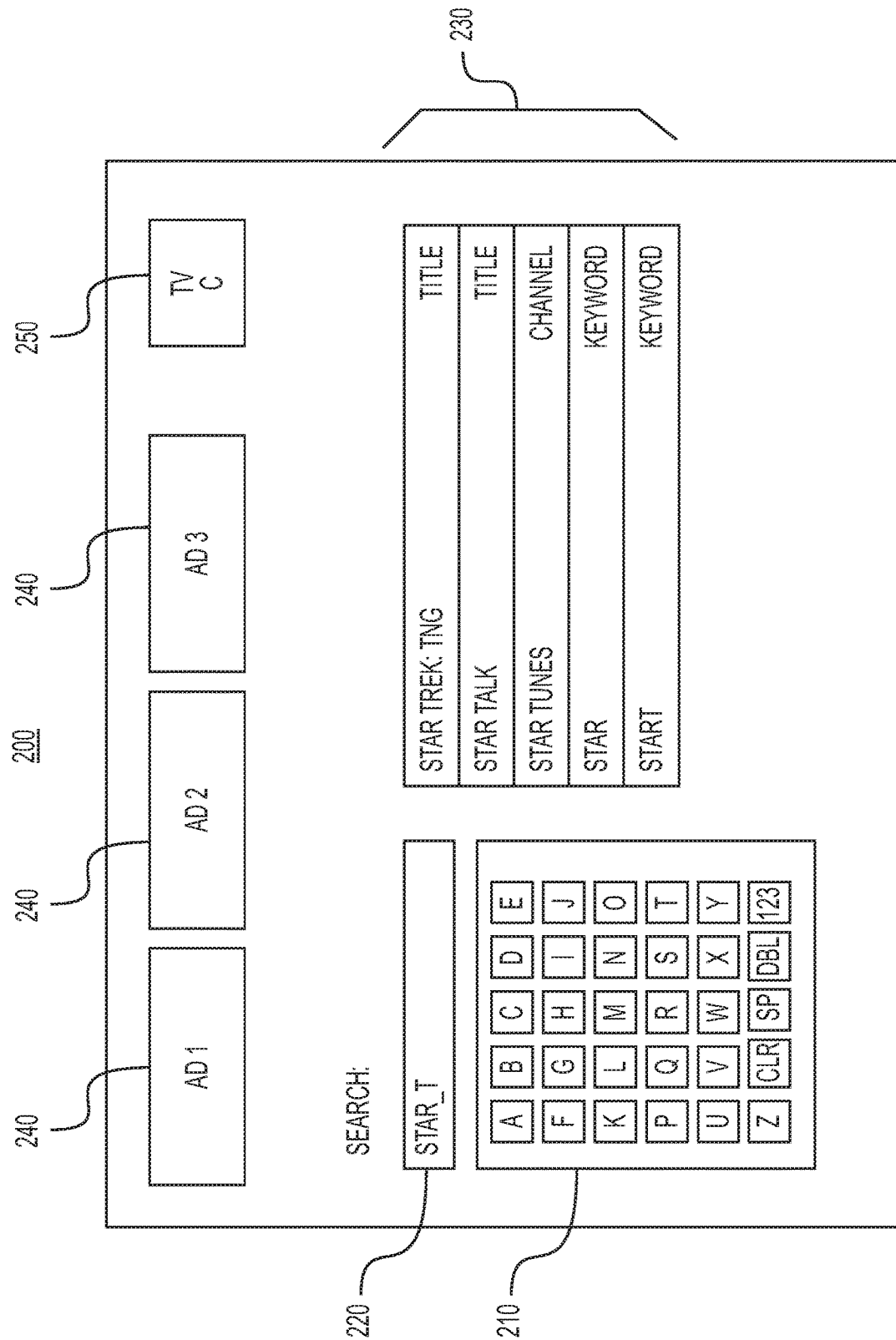
FIG. 2 depicts an exemplary user interface for searching for electronic media assets by title, according to one or more embodiments.

Consumer 110 may search for desired electronic media assets using the infrastructure for retrieving and displaying electronic media assets. For example, consumer 110 may interact with set top box 140 by way of wireless remote control 120 and television 130 in order to enter search terms related to desired electronic media assets. FIG. 2 depicts an exemplary user interface for searching for electronic media assets by title, according to one or more embodiments.

As shown in FIG. 2, user interface 200 may include a display area 220 for currently-entered search terms. An alphanumeric keypad 210 may be provided for selecting letters, numbers, and other characters to include in the search terms. However, search terms may be entered by any suitable device, such as, for example, physical or simulated keyboards provided by a personal computer, laptop, smartphone, tablet, or wireless remote control 120, etc. In addition, search terms may be entered in non-alphanumeric format, such as by voice commands or gestures, etc. User interface 200 may include a results listing 230 that may display titles and other information about electronic media assets matching currently-entered search terms. For example, results listing 230 may include a title and result type for each search result in results listing 230. User interface 200 may further include additional information that may or may not be associated with search terms 220. For example, one or more advertisements 240 may be displayed, possibly in response to search terms 220. In addition, a logo or other indicia 250 of the consumer's provider of electronic media asset services may be displayed. User interface 200 may allow the consumer to select an advertisement 240 or the logo 250 in order to display additional information about the advertised product or service or the provider of electronic media asset services. Alternatively, the consumer may select a search result item in results listing 230 in order to see a list of electronic media assets associated with the search result item.

Figure 3:
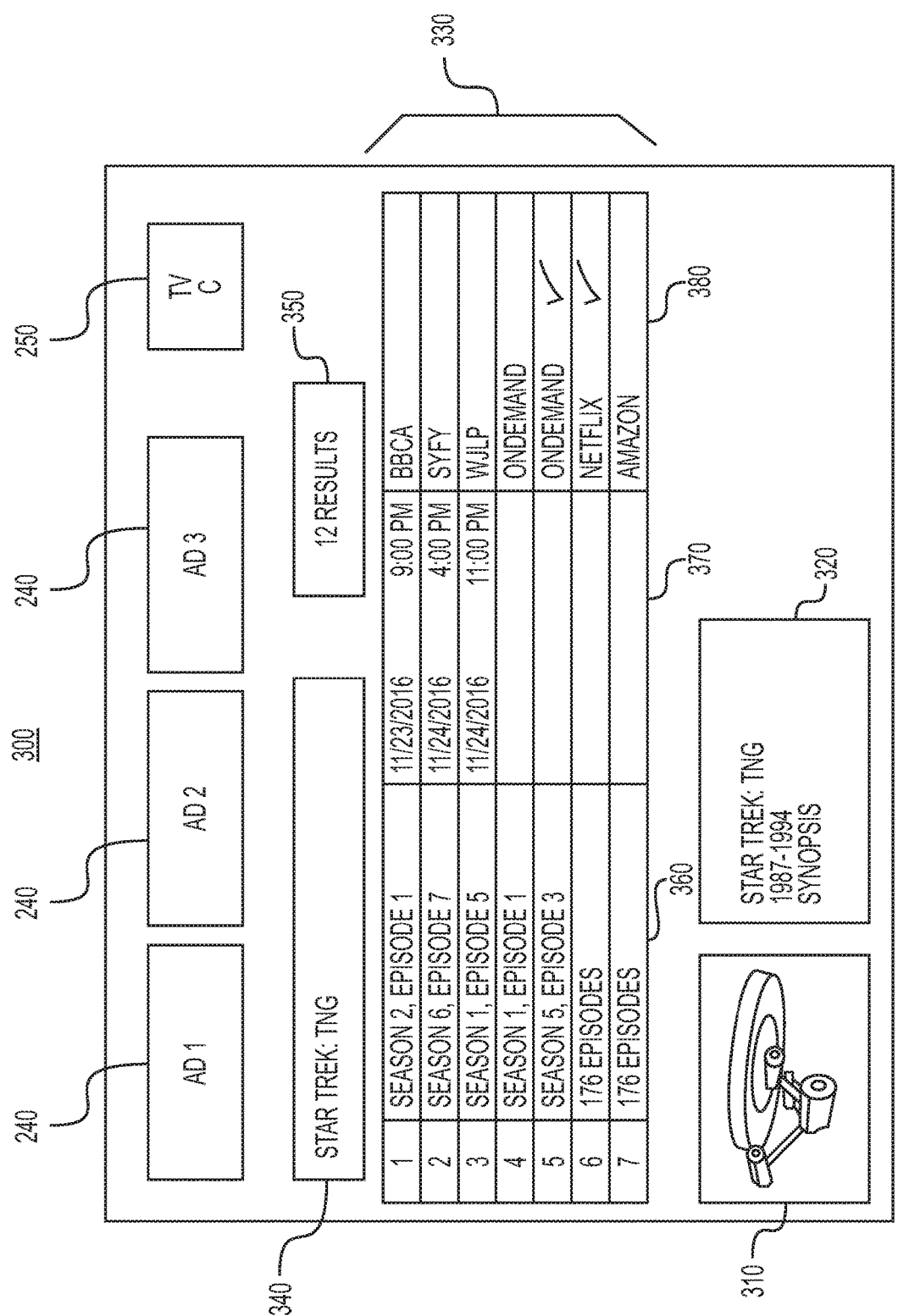
FIG. 3 depicts an exemplary user interface for viewing multiple electronic media assets by title, according to one or more embodiments.

FIG. 3 depicts an exemplary user interface 300 for viewing multiple electronic media assets by title, according to one or more embodiments. As shown in FIG. 3, the user interface 300 for viewing multiple electronic media assets by title may include a title 340 associated with the listed electronic media assets, and an indication 350 of the number electronic media assets listed. The user interface 300 may include additional information about the titled electronic media assets such as, for example, an image 310 associated with the electronic media assets and text description 320 of the electronic media assets. The user interface 300 may include a listing 330 of electronic media assets that may include, for example, a specific description 360 of the electronic media asset, a date and time 370 associated with the electronic media asset, and a source 380 of the electronic media asset. For example, the source of an electronic media asset may be transactional, subscription, advertising-supported, or linear airings, etc. Linear airings may include airings that are already in progress or that have a future start time. For assets that require payment or a subscription, such as transactional or subscription assets, source 380 may include indicia of the availability of the electronic media asset to the consumer. For example, source 380 may include a special character (such as a check mark shown in FIG. 3), a letter, symbol, a particular color, shading, or other graphic or text formatting effect to distinguish such electronic media assets. When more electronic media assets are available than can be displayed within listing 330 of electronic media assets, for example, if twelve electronic media assets are available but only six electronic media assets can be displayed within listing 330, listing 330 may be scrolled to adjacent electronic media assets by a user interaction device, such as wireless remote control 120 depicted in FIG. 1, or by other means such as, for example, voice or gestural commands, etc. The user interface 300 may additionally provide user interface elements (not shown) for scrolling within listing 330.

Figure 4A:
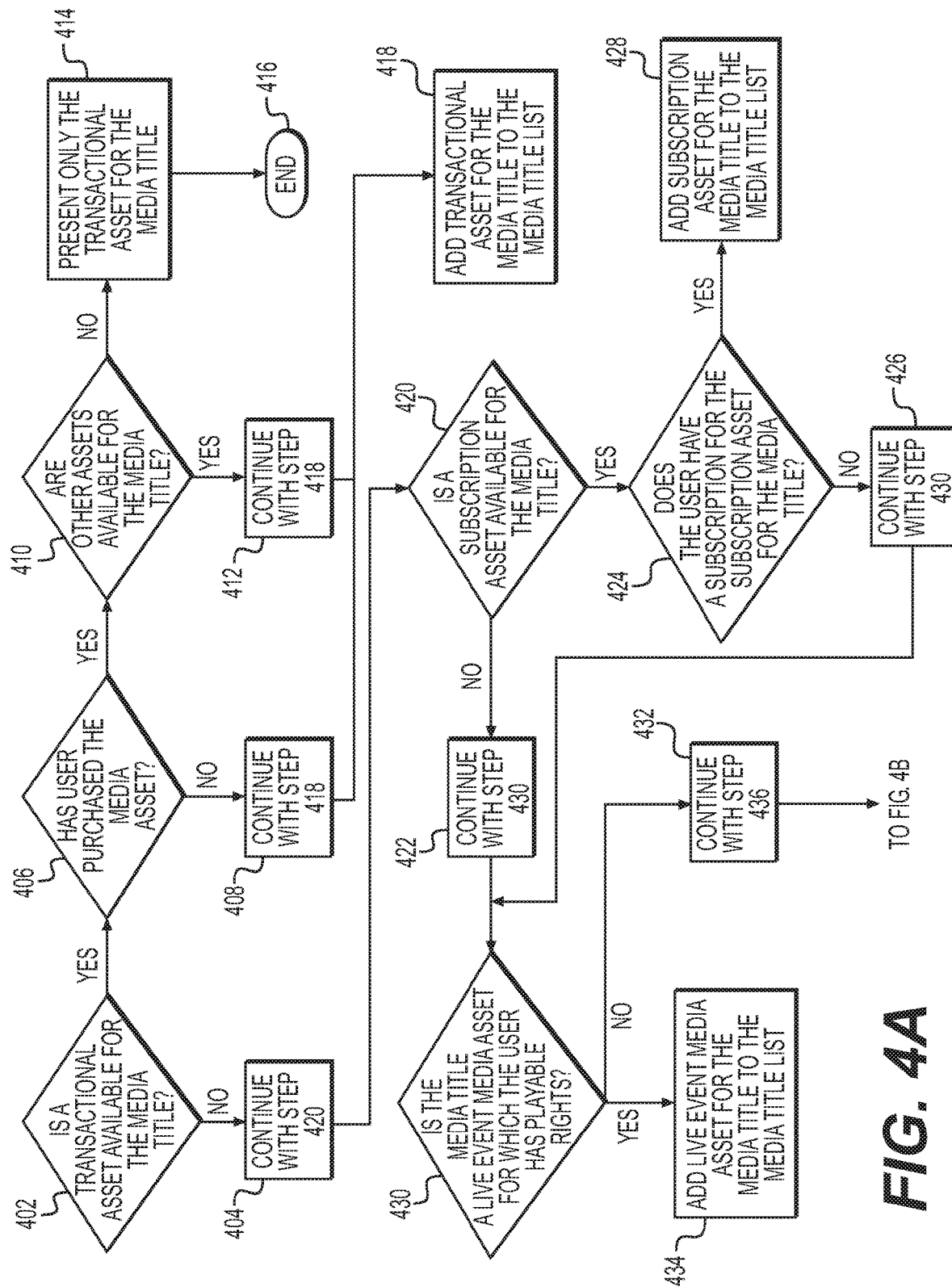
FIGS. 4A-4B depicts a flowchart of a method of presenting electronic media assets, according to one or more embodiments.
Figure 4B:
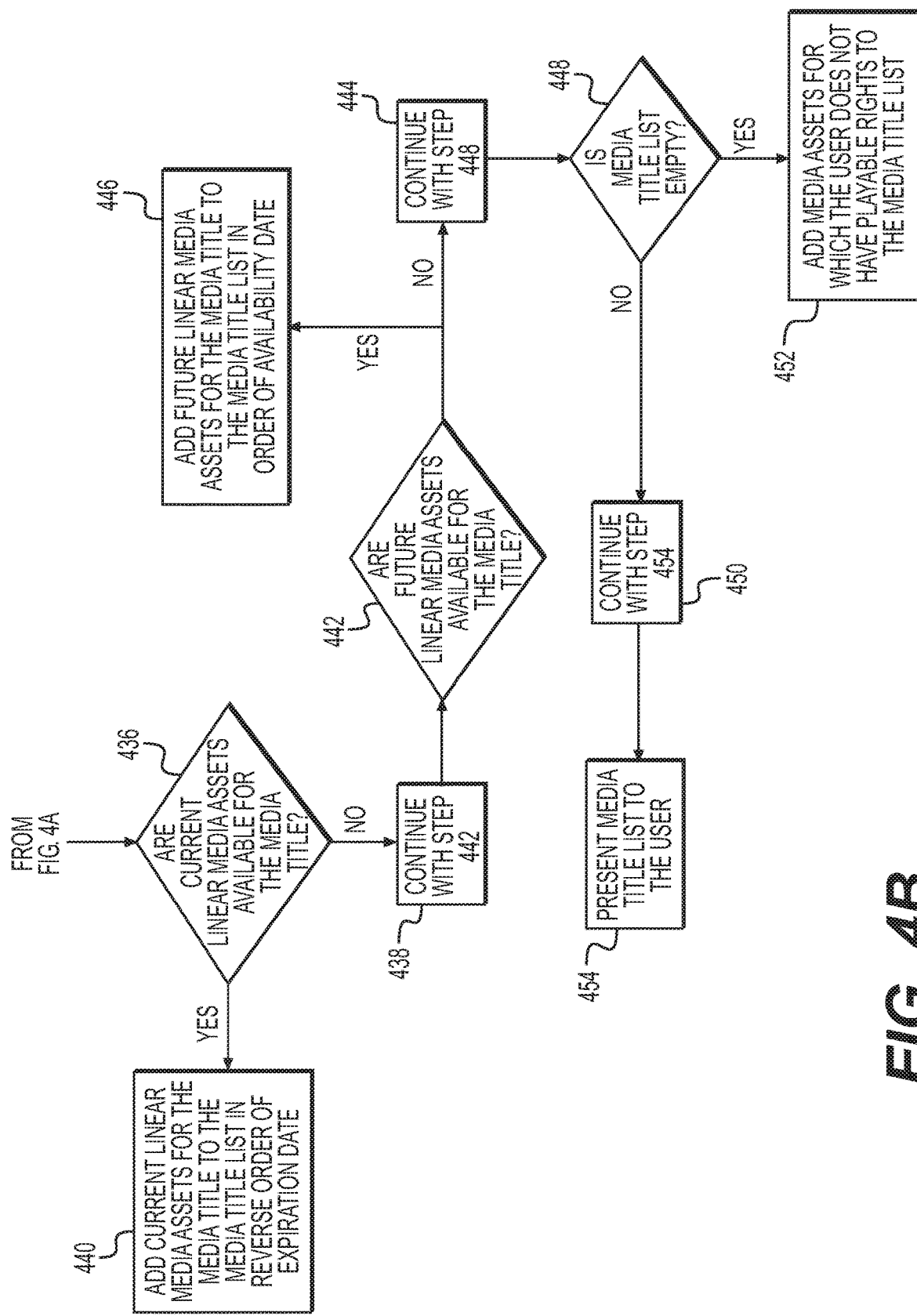

However, as can be seen in FIG. 3, a listing of electronic media assets may include multiple assets available currently or at different times in the future, may include assets the consumer may access immediately based on prior purchases or subscriptions, and may include assets for which additional cost may be incurred, etc. This may cause confusion or dissatisfaction for the consumer. Thus, there is a need for a method of presenting electronic media assets that accommodates multiple sources of electronic media assets. FIGS. 4A-4B depicts a flowchart of a method of presenting electronic media assets, according to one or more embodiments.

As shown in FIGS. 4A-4B, in operation 402 a method of presenting electronic media assets may determine if a transactional asset is available for the media title. If no transactional asset is available for the media title, then the method may continue with step 420. If a transactional asset is available for the media title, then, at operation 406, the method may determine if the consumer has purchased the transactional media asset in order to obtain playable rights for the transactional media asset. If the consumer has not purchased the transactional media asset, then the method may continue with operation 418. If the consumer has purchased the transactional media asset, then at operation 410, the method may determine if other assets are available for the media title. If other assets are available for the media title, then the method may continue with operation 418. If no other assets are available for the media title, then at operation 414 the method may present only the transactional asset for the media title and end the method. At operation 418, the method may add transactional assets for the media title to a media title list. At operation 420, the method may determine if a subscription asset is available for the media title. If a subscription asset is available for the media title, then the method may continue with operation 430. If a subscription asset is available for the media title, then at operation 424 the method may determine if the consumer has a subscription for the subscription asset for the media title, thus granting the consumer playable rights to the subscription asset. If the consumer has a subscription for the subscription asset for the media title, then the method may continue with operation 430. If the consumer has a subscription for the subscription asset for the media title, then at operation 428, the method may add the subscription asset for the media title to the media title list. At operation 430, the method may determine if the media title is a live event media asset for which the user has playable rights. If the user does not have playable rights for the live event media asset, then the method may continue with operation 436. If the media title is a live event media asset for which the user has playable rights, then at operation 434 the method may add the live event media asset for the media title to the media title list. At operation 436, the method may determine if current linear media assets are available for the media title. If no current linear media assets are available for the media title, then the method may continue with step 442. If current linear media assets are available for the media title, then at operation 440, the method may add the current linear media assets for the media title to the media title list. For example, the method may add the current linear media assets for the media title to the media title list in reverse order of expiration date and time, but other orderings of the current linear media assets may be used. At operation 442, the method may determine if any future linear media assets are available for the media title. If no future linear media assets are available for the media title, then the method may continue with step 448. If future linear media assets are available for the media title, then at operation 446 the method may add the future linear media assets for the media title to the media title list. For example, the method may add the future linear media assets for the media title to the media title list in order of availability date, but other orderings of the future linear media assets may be used. At operation 448, the method may determine if the media title list is empty. If the media title list is not empty, then the method may continue with operation 454. If the media title list is empty, then at operation 452, the method may add media assets for which the consumer does not have playable rights to the media title list. Alternatively, the method may display a message indicating that no media assets for which the consumer has playable rights are available. Finally, at operation 454, the method may present the media title list to the consumer.

Figure 5:
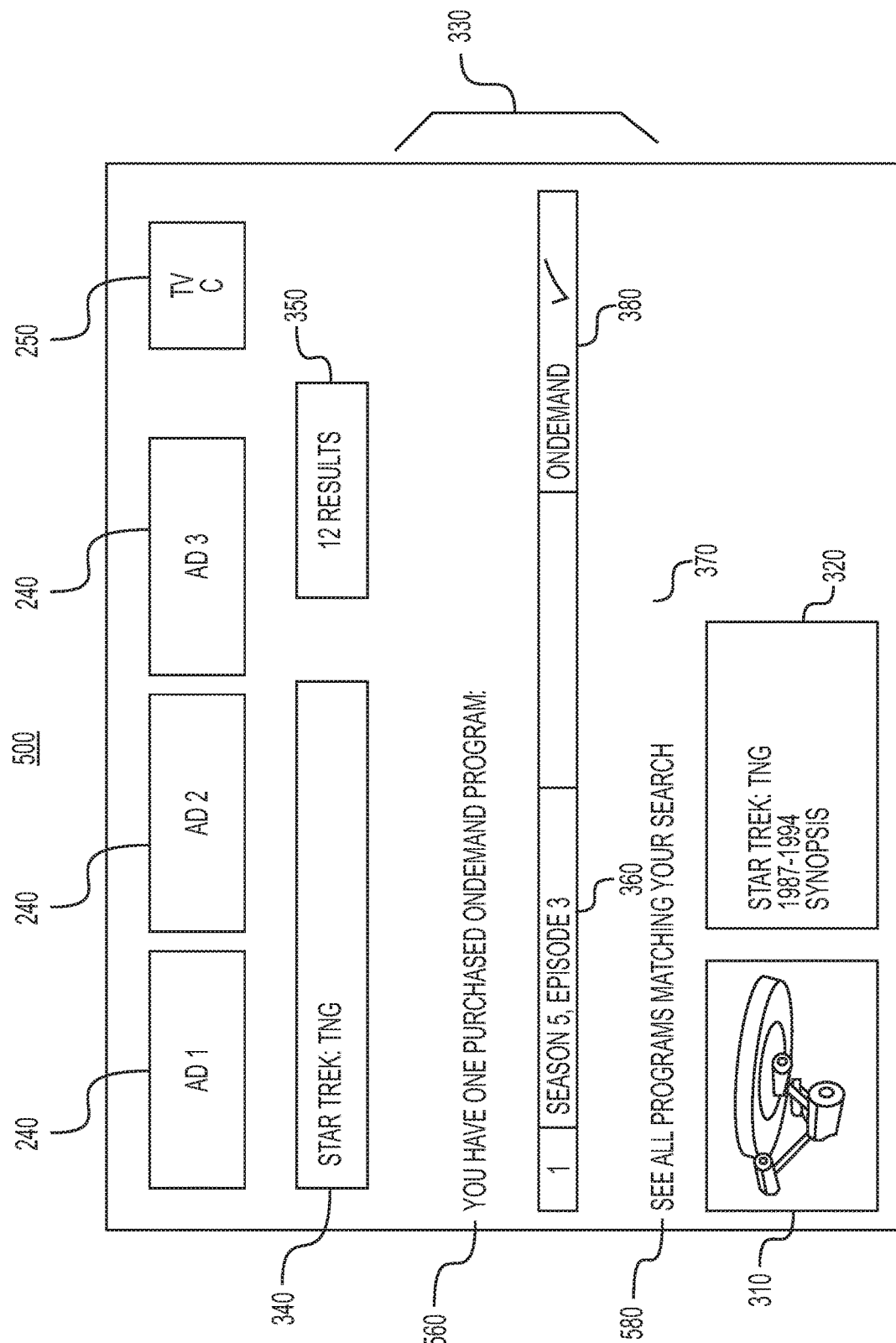
FIG. 5 depicts an exemplary user interface for viewing multiple electronic media assets by title, according to one or more embodiments.
Figure 6:
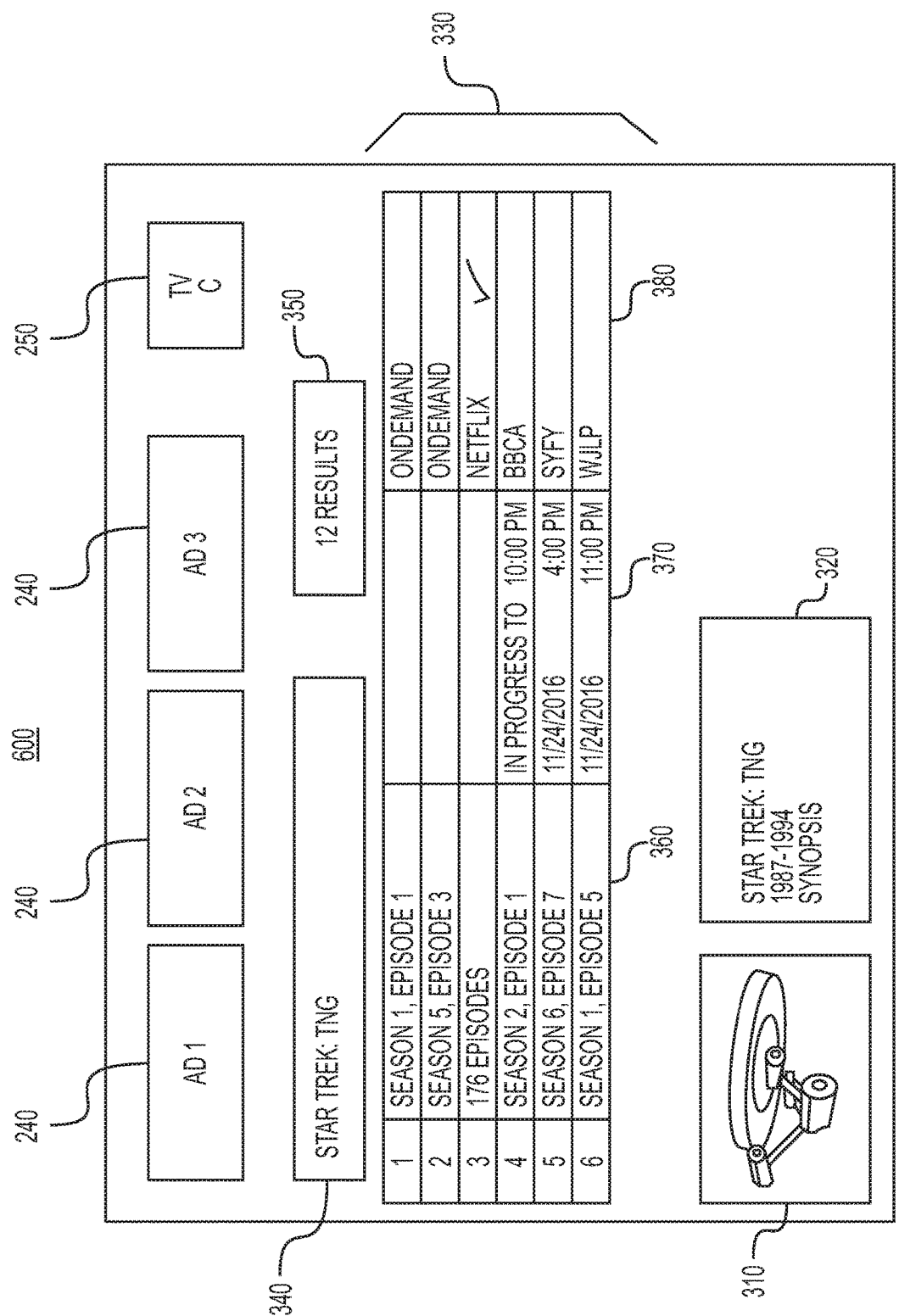
FIG. 6 depicts an exemplary user interface for viewing multiple electronic media assets by title, according to one or more embodiments.

FIGS. 5 and 6 depict exemplary user interfaces for viewing multiple electronic media assets by title, such as might be produced by the method of FIG. 4. FIG. 5 depicts a user interface 500 including a search result in which a single transactional media asset is available for which the consumer has purchased the transactional media asset is displayed in listing 330. A similar user interface may be presented when multiple transactional media assets are available for which the consumer has purchased the transactional media asset. The user interface 500 may include a message 560 indicating, for example, a number of available transactional media assets and a source of available transactional media assets, etc. In addition, the user interface 500 may include an option 580 for the consumer to choose to display all available media assets related to the selected title. The consumer may select the option to display all available media assets related to the selected title by a user interaction device, such as wireless remote control 120 depicted in FIG. 1, or by other means such as, for example, voice or gestural commands, etc. FIG. 5 depicts a user interface 500 including a search result in which all available media assets related to the selected title are displayed in listing 330. For example, the available media assets related to the selected title displayed in listing 330 may be ordered according to the method of FIGS. 4A-4B.

Figure 7:
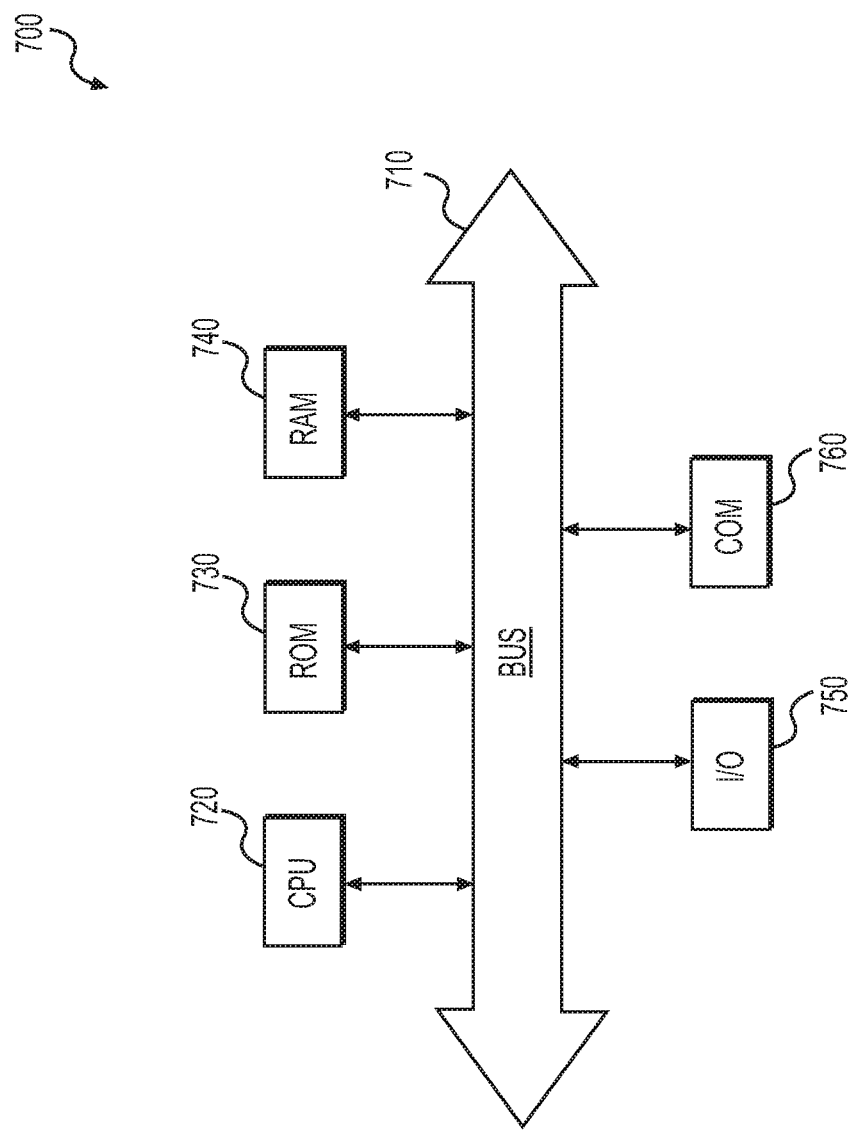
FIG. 7 depicts an exemplary device in which one or more embodiments may be implemented

FIG. 7 illustrates a high-level functional block diagram of an exemplary device 700, in which embodiments of the present disclosure, or portions thereof, may be implemented, e.g., as computer-readable code. For example, each of the exemplary systems, user interfaces and methods described above with respect to FIGS. 1-6 can be implemented in device 700 using hardware, software, firmware, tangible computer readable media having instructions stored thereon, or a combination thereof and may be implemented in one or more computer systems or other processing systems. Hardware, software, or any combination of such may implement each of the exemplary systems, user interfaces and methods described above with respect to FIGS. 1-6.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-6 may be implemented using device 700. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 7, device 700 may include a central processing unit (CPU) 720. CPU 720 may be any type of processor device including, for example, any type of special purpose or a general purpose microprocessor device. As will be appreciated by persons skilled in the relevant art, CPU 720 also may be a single processor in a multi-core/multi-processor system, such system operating alone, or in a cluster of computing devices operating in a cluster or server farm. CPU 720 may be connected to a data communication infrastructure 710, for example, a bus, message queue, network, or multi-core message-passing scheme.

Device 700 may also include a main memory 740, for example, random access memory (RAM), and may also include a secondary memory 730. Secondary memory 730, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into device 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 700.

Device 700 may also include a communications interface ("COM") 760. Communications interface 760 allows software and data to be transferred between device 700 and external devices. Communications interface 760 may include a modem, a network interface (such as an Ethernet card), a communications port, a PCMCIA slot and card, or the like. Software and data transferred via communications interface 760 may be in the form of signals, which may be electronic, electromagnetic, optical, or other signals capable of being received by communications interface 760. These signals may be provided to communications interface 760 via a communications path of device 700, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of presenting electronic media assets, the method comprising:
    retrieving metadata for a plurality of electronic media assets matching a user search query from a first streaming electronic media asset provider and a second streaming electronic media asset provider;
    determining, based on the retrieved metadata, that one or more electronic media assets among the plurality of electronic media assets is not an on-demand electronic media asset and is not a current or future broadcast electronic media asset;
    upon determining that one or more electronic media assets among the plurality of electronic media assets is not an on-demand electronic media asset and is not a current or future broadcast electronic media asset, selecting to not add the one or more media assets to a media asset list;
    determining that the media asset list is empty;
    upon determining that the media asset list is empty, adding all electronic media assets among the plurality of electronic media assets for which the consumer does not have playable rights to the media asset list;
generating a media asset menu using the retrieved metadata for each media asset in the media asset list; and
presenting the media asset menu to the consumer.

2. The method of claim 1, wherein the metadata for each electronic media asset among the plurality of electronic media assets includes one or more of a detailed title, a number of associated electronic media assets, an availability date, a start time, a length, consumer playable rights, and an expiration date and time.

3. The method of claim 1, wherein the metadata is retrieved from one or more of a cable television provider, a streaming media service, and an electronic media asset metadata server.

4. The method of claim 1, the method further comprising:
determining if the consumer has purchased playable rights to one or more transactional electronic media assets; and
adding transactional electronic media assets to the media asset list for transactional electronic media assets for which the consumer has purchased playable rights.

5. The method of claim 1, the method further comprising:
determining if the consumer has purchased playable rights to one or more of the subscription electronic media assets; and
adding subscription electronic media assets to a media asset list for subscription electronic media assets for which the consumer has purchased playable rights.

6. The method of claim 1, the method further comprising: adding current linear electronic media assets to the media asset list in reverse order of a respective expiration date and time for each current linear electronic media asset.

7. The method of claim 1, the method further comprising: adding future linear electronic media assets to the media asset list in order of a respective availability date and time for each future linear electronic media asset.

8. A non-transitory computer readable medium storing a program causing a computer to execute a method of presenting electronic media assets, the method comprising:
retrieving metadata for a plurality of electronic media assets matching a user search query from a first streaming electronic media asset provider and a second streaming electronic media asset provider;
determining, based on the retrieved metadata, if one or more electronic media assets among the plurality of electronic media assets is an on-demand electronic media asset;
upon determining that one or more electronic media assets among the plurality of electronic media assets is an on-demand electronic media asset, adding the an on-demand electronic media assets to a media asset list;
determining, based on the retrieved metadata, if one or more electronic media assets among the plurality of electronic media assets is a current or future broadcast electronic media asset;
upon determining that one or more electronic media assets among the plurality of electronic media assets is a current or future broadcast electronic media asset, adding the current or future broadcast electronic media assets to the media asset list following the on-demand electronic media assets;
determining if the media asset list is empty;
upon determining that the media asset list is empty, adding all electronic media assets among the plurality of electronic media assets for which the consumer does not have playable rights to the media asset list;
generating a media asset menu using the retrieved metadata for each media asset in the media asset list; and
presenting the media asset menu to the consumer.

9. The non-transitory computer readable medium according to claim 8, the method further comprising:
determining if the consumer has purchased playable rights to one or more transactional electronic media assets; and
adding transactional electronic media assets to the media asset list for transactional electronic media assets for which the consumer has purchased playable rights.

10. The non-transitory computer readable medium according to claim 8, the method further comprising:
determining if the consumer has purchased playable rights to one or more of the subscription electronic media assets; and
adding subscription electronic media assets to a media asset list for subscription electronic media assets for which the consumer has purchased playable rights.

11. The non-transitory computer readable medium according to claim 8, the method further comprising: adding current linear electronic media assets to the media asset list in reverse order of a respective expiration date and time for each current linear electronic media asset.

12. The non-transitory computer readable medium according to claim 8, the method further comprising: adding future linear electronic media assets to the media asset list in order of a respective availability date and time for each future linear electronic media asset.

13. A computer system for presenting electronic media assets, the system comprising:
a memory having processor-readable instructions stored therein; and
a processor configured to access the memory and execute the processor-readable instructions, which when executed by the processor configures the processor to perform a plurality of functions, including functions to:
retrieve metadata for a plurality of electronic media assets matching a user search query from a first streaming electronic media asset provider and a second streaming electronic media asset provider;
determine, based on the retrieved metadata, if one or more electronic media assets among the plurality of electronic media assets is an on-demand electronic media asset;
upon determining that one or more electronic media assets among the plurality of electronic media assets is an on-demand electronic media asset, add the an on-demand electronic media assets to a media asset list;
determine, based on the retrieved metadata, if one or more electronic media assets among the plurality of electronic media assets is a current or future broadcast electronic media asset;
upon determining that one or more electronic media assets among the plurality of electronic media assets is a current or future broadcast electronic media asset, add the current or future broadcast electronic media assets to the media asset list following the on-demand electronic media assets;
determine if the media asset list is empty;
upon determining that the media asset list is empty, add all electronic media assets among the plurality of electronic media assets for which the consumer does not have playable rights to the media asset list;
generate a media asset menu using the retrieved metadata for each media asset in the media asset list; and presenting the media asset menu to the consumer.

14. The computer system of claim 13, wherein the plurality of functions performed by the processor when executing the processor-readable instructions further includes functions to:
   determine if the consumer has purchased playable rights to one or more transactional electronic media assets; and
   add transactional electronic media assets to a media asset list for transactional electronic media assets for which the consumer has purchased playable rights.

15. The computer system of claim 13, wherein the plurality of functions performed by the processor when executing the processor-readable instructions further includes functions to:
   determine if the consumer has purchased playable rights to one or more of the subscription electronic media assets; and
   add subscription electronic media assets to a media asset list for subscription electronic media assets for which the consumer has purchased playable rights.

16. The computer system of claim 13, wherein the the plurality of functions performed by the processor when executing the processor-readable instructions further includes functions to: add current linear electronic media assets to the media asset list in reverse order of a respective expiration date and time for each current linear electronic media asset.

17. The computer system of claim 13, wherein the plurality of functions performed by the processor when executing the processor-readable instructions further includes functions to: add future linear electronic media assets to the media asset list in order of a respective availability date and time for each future linear electronic media asset.

* * * * *